US010837544B2

(12) United States Patent
Dewa et al.

(10) Patent No.: US 10,837,544 B2
(45) Date of Patent: Nov. 17, 2020

(54) AXLE ASSEMBLY

(71) Applicant: KOMATSU LTD., Tokyo (JP)

(72) Inventors: Tatsuya Dewa, Tokyo (JP); Takao Nakamura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 90 days.

(21) Appl. No.: 16/082,640

(22) PCT Filed: Sep. 11, 2017

(86) PCT No.: PCT/JP2017/032687
§ 371 (c)(1),
(2) Date: Sep. 6, 2018

(87) PCT Pub. No.: WO2018/066316
PCT Pub. Date: Apr. 12, 2018

(65) Prior Publication Data
US 2019/0024778 A1 Jan. 24, 2019

(30) Foreign Application Priority Data
Oct. 3, 2016 (JP) ................. 2016-195715

(51) Int. Cl.
F16H 57/04 (2010.01)
F16H 48/08 (2006.01)
(Continued)

(52) U.S. Cl.
CPC ..... F16H 57/0493 (2013.01); F16H 57/0423 (2013.01); F16H 57/0424 (2013.01);
(Continued)

(58) Field of Classification Search
None
See application file for complete search history.

(56) References Cited

U.S. PATENT DOCUMENTS 1,966,434 A * 7/1934 Barker ................ F16H 57/0483
184/11.1
5,197,929 A 3/1993 Scheiber et al.
(Continued)

FOREIGN PATENT DOCUMENTS

JP 2-20528 Y2 6/1990
JP 2-140039 U 11/1990
(Continued)

OTHER PUBLICATIONS

The International Search Report for the corresponding international application No. PCT/JP2017/032687, dated Oct. 10, 2017.
(Continued)

Primary Examiner — Justin Holmes
(74) Attorney, Agent, or Firm — Global IP Counselors, LLP

(57) ABSTRACT

An axle assembly includes a first axle shaft, an axle housing, a first inlet port, a first outlet port, and a first oil passage. The axle housing has a first housing component that includes a first space in which at least part of the first axle shaft is disposed, a flange that is adjacent to the first space and includes a communicating hole, and a central housing component that includes a central space connected to the first space through the communicating hole of the flange. The first inlet port is disposed below an axis of the first axle shaft in the central space. The first outlet port is disposed in the first space. The first oil passage extends from the first inlet port to the first outlet port.

18 Claims, 9 Drawing Sheets

(51) Int. Cl.
*F16H 48/40* (2012.01)
*F16H 48/22* (2006.01)

(52) U.S. Cl.
CPC ..... *F16H 57/0457* (2013.01); *F16H 57/0471* (2013.01); *F16H 57/0473* (2013.01); *F16H 57/0483* (2013.01); *F16H 48/08* (2013.01); *F16H 48/22* (2013.01); *F16H 2048/085* (2013.01); *F16H 2048/405* (2013.01)

(56) References Cited

U.S. PATENT DOCUMENTS

| | | | | |
|---|---|---|---|---|
| 5,316,106 | A * | 5/1994 | Baedke | B60K 17/16 184/104.3 |
| 5,989,143 | A * | 11/1999 | Bell | F16H 57/0421 184/11.2 |
| 6,502,665 | B1 * | 1/2003 | Brehob | F16H 57/0483 184/11.2 |
| 9,457,898 | B2 | 10/2016 | Russell | |
| 2014/0013886 | A1 | 1/2014 | Weber et al. | |
| 2016/0341301 | A1 * | 11/2016 | Slesinski | F16H 57/0441 |

FOREIGN PATENT DOCUMENTS

| | | |
|---|---|---|
| JP | 4-504460 A | 8/1992 |
| JP | 6-48028 B2 | 6/1994 |
| JP | 7-269684 A | 10/1995 |
| JP | 2001-271916 A | 10/2001 |
| JP | 2008-240822 A | 10/2006 |
| JP | 2012-202535 A | 10/2012 |
| JP | 2013-164131 A | 8/2013 |
| WO | 2014/003125 A1 | 1/2014 |

OTHER PUBLICATIONS

The extended European search report for the corresponding European application No. 17858155.9, dated Aug. 8, 2019.

* cited by examiner

AXLE ASSEMBLY

CROSS-REFERENCE TO RELATED APPLICATIONS

This application is a U.S. National stage application of International Application No. PCT/JP2017/032687, filed on Sep. 11, 2017. This U.S. National stage application claims priority under 35 U.S.C. § 119(a) to Japanese Patent Application No. 2016-195715, filed in Japan on Oct. 3, 2016, the entire contents of which are hereby incorporated herein by reference.

BACKGROUND

Field of the Invention

The present invention relates to an axle assembly.

Background Information

The axle assembly includes an axle shaft and an axle housing that houses the axle shaft. The axle housing is filled with lubricating oil to lubricate the rotating body (such as a gear) and the axle shaft.

The lubricating oil has a tendency to overheat due to heat generated by a rotating body or the like at locations where the operating conditions are harsh. Therefore, in order to cool the lubricating oil, a device is installed in the axle assembly to circulate the lubricating oil in the axle housing. However, a problem is that when a power unit such as a pump is provided to circulate the lubricating oil, this drives up the cost.

In view of this, it has been proposed that the axle assembly be provided with a circulation circuit for circulating the lubricating oil, without the use of a power unit. For example, with the axle device described in Patent Literature 1, the lubrication circuit has a temporary holding tank disposed above the bevel gear, an opening provided to the upper part of the differential body, and a downwardly sloped line connected to the opening. The line communicates with the interior of the left and right axle housings.

With the axle device described in JP-A 2008-240822, the lubricating oil is splashed upward by the bevel gear in the differential body and collected in the temporary holding tank. The lubricating oil flows from the opening, through the line, and into the interior of the right and left axle housings. The spaces inside the left and right axle housings communicate with the space inside the differential body. Therefore, the lubricating oil passes through the inside of the left and right axle housings and returns to the inside of the differential body. The lubricating oil thus circulates through the axle housing, which helps prevent overheating of the lubricating oil.

SUMMARY

With the axle device described in JP-A 2008-240822, the lubricating oil is splashed upward by the bevel gear, and the lubricating oil is circulated by utilizing the potential energy of the lubricating oil that is splashed. Therefore, a problem is that there is a large amount of energy loss. Also, it is difficult to increase the flow of lubricating oil to be circulated without making the device larger, and there is a problem in that the cooling effect of the lubricating oil is low in proportion to the size of the device.

An object of the present invention is to provide an axle assembly with which energy loss can be reduced and the lubricating oil cooling effect can be enhanced while minimizing the increase in size.

The axle assembly according to one aspect of the present invention comprises a first axle shaft, an axle housing, a first inlet port, a first outlet port, and a first oil passage. The axle housing has a first housing component, a flange, and a central housing component. The first housing component includes a first space in which at least part of the first axle shaft is disposed. The flange is adjacent to the first space and includes a communicating hole. The central housing component includes a central space connected to the first space through the communicating hole of the flange. The first inlet port is disposed below the axis of the first axle shaft in the central space. The first outlet port is disposed in the first space. The first oil passage extends from the first inlet port to the first outlet port.

With the axle assembly according to this aspect, the lubricating oil in the central space flows through the first inlet port, the first oil passage, and the first outlet port to the first space. Since the first space communicates with the central space, the lubricating oil returns from the first space to the central space. Circulating the lubricating oil in this manner improves the lubricating oil cooling effect. Also, since the first inlet port is disposed below the axis of the first axle shaft in the central space, the lubricating oil flows into the oil passage from the first inlet port. Therefore, energy loss can be reduced as compared to when the lubricating oil is splashed up and its potential energy is utilized. Also, since there is no need to splash the lubricating oil, the lubricating oil cooling effect can be improved while minimizing the increase in the size of the axle assembly.

The first outlet port may be disposed below the axis of the first axle shaft. In this case, the lubricating oil can efficiently flow from the first outlet port into the first space.

The axle assembly may further comprise a rotating body disposed in the central space. The first inlet port may be disposed adjacent to the rotating body. In this case, the lubricating oil can be discharged efficiently. Also, it is possible to effectively cool the lubricating oil around the rotating body, where the temperature tends to be higher.

The first inlet port may be disposed facing a space located radially outward from the rotating body. In this case, the lubricating oil can be discharged efficiently. Also, it is possible to effectively cool the lubricating oil around the rotating body, where the temperature tends to be higher.

The rotating body may be a bevel gear. In this case, the lubricating oil can be discharged efficiently. Also, it is possible to effectively cool the lubricating oil around the bevel gear, where the temperature tends to be higher.

The rotating body may be a brake disk. In this case, the lubricating oil can be discharged efficiently. Also, it is possible to effectively cool the lubricating oil around the brake disk, where the temperature tends to be higher.

The first oil passage may be disposed inside the axle housing. In this case, it is possible to further minimize the increase in size of the axle assembly.

The first oil passage may be disposed outside the axle housing. In this case, the lubricating oil cooling effect can be further improved.

The axle assembly may further comprise a second inlet port, a second outlet port, a second oil passage, a first rotating body, and a second rotating body. The second inlet port may be disposed below the axis of the first axle shaft in the central space. The second outlet port may be disposed in the first space. The second oil passage may extend from the second inlet port to the second outlet port. The first rotating body may be disposed in the central space. The second rotating body may be disposed in the central space. The first inlet port may be disposed adjacent to the first rotating body. The second inlet port may be disposed adjacent to the second rotating body. In this case, the lubricating oil can be discharged efficiently. Also, it is possible to effectively cool the lubricating oil around the first rotating body and around the second rotating body, where the temperature tends to be higher.

The first rotating body may be a bevel gear. The second rotating body may be a brake disk.

In this case, the lubricating oil can be discharged efficiently. In addition, it is possible to effectively cool the lubricating oil around the bevel gear and around the brake disk, where the temperature tends to be higher.

The axle assembly may further comprise a second axle shaft, a third inlet port, a third outlet port, and a third oil passage. The second axle shaft may be aligned in the axial direction with the first axle shaft. The axle housing may further include a second housing component. The second housing component may include a second space in which at least part of the second axle shaft is disposed. The third inlet port may be disposed below the axis of the first axle shaft in the central space. The third outlet port may be disposed in the second space. The third oil passage may extend from the third inlet port to the third outlet port. In this case, the lubricating oil can be circulated between the first space, the central space, and the second space. This further improves the lubricating oil cooling effect.

The axle assembly may further comprise a third outlet port and a third oil passage. The third outlet port may be disposed in the second space. The third oil passage may branch off from the first oil passage and extend to the third outlet port. In this case, the lubricating oil can be circulated between the first space, the central space, and the second space. This further improves the lubricating oil cooling effect.

The axle assembly may further comprise a reduction gear disposed within the axle housing. The first inlet port may be disposed more to the center in the left and right direction than the reduction gear. In this case, the lubricating oil can be circulated between the left and right spaces of the reduction gear. This further improves the lubricating oil cooling effect.

With the present invention, in an axle assembly, it is possible to reduce energy loss and improve the lubricating oil cooling effect while minimizing an increase in size.

DETAILED DESCRIPTION OF EMOBDIMENT(S)

Figure 1:
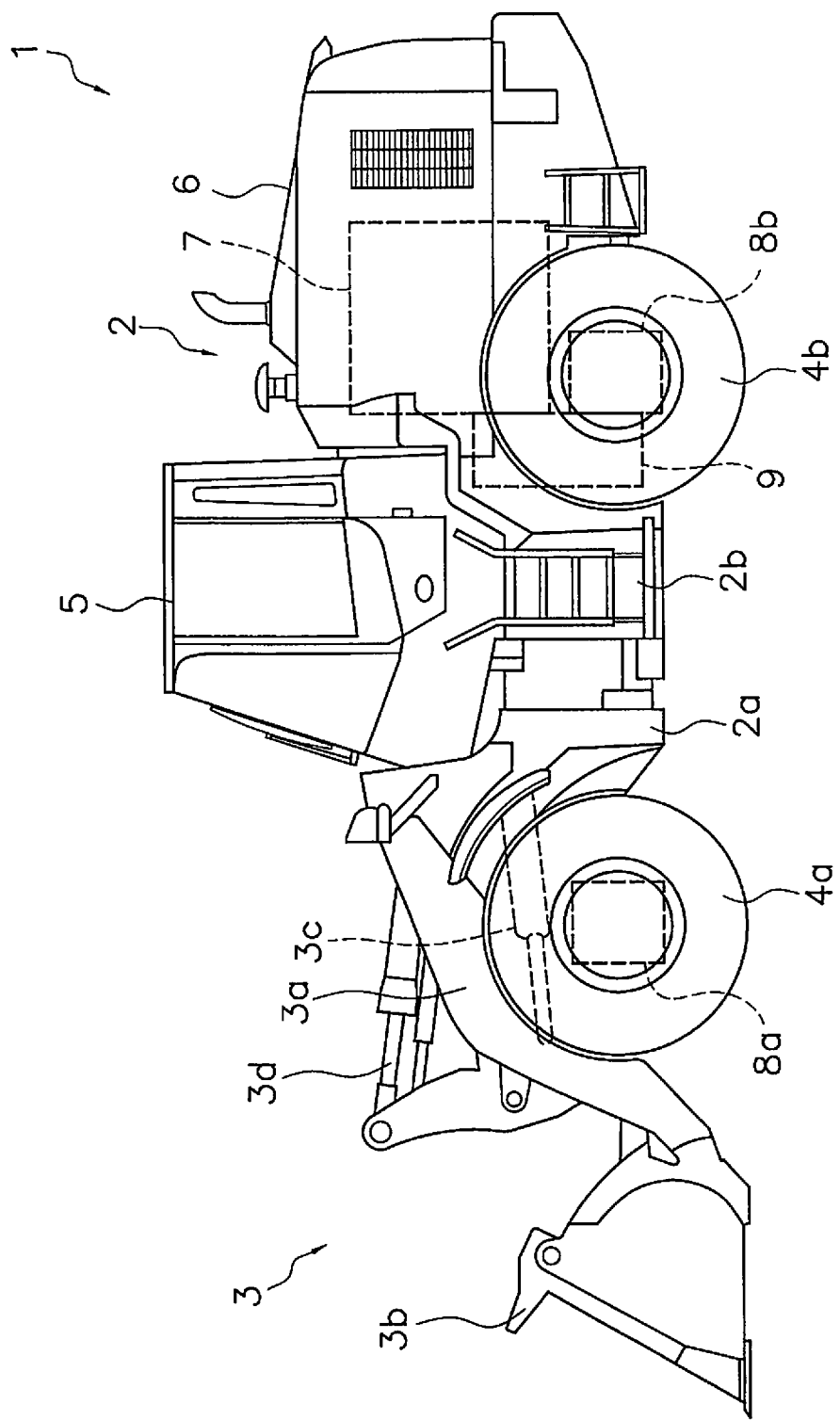
FIG. 1 is a side view of a wheel loader according to an embodiment.

The working vehicle according to an embodiment will now be described through reference to the drawings. FIG. 1 is a side view of a work vehicle 1 according to this embodiment. The work vehicle 1 in this embodiment is a wheel loader. The working vehicle 1 comprises a vehicle body 2, a working implement 3, a plurality of running wheels 4a and 4b, a cab 5, and an engine 7. The vehicle body 2 has a front body 2a and a rear body 2b. The front body 2a and the rear body 2b are linked to each other so as to be able to pivot left and right.

The working implement 3 is mounted on the front body 2a. The working implement 3 has a boom 3a, a bucket 3b, a lift cylinder 3c, and a bucket cylinder 3d. The boom 3a is rotatably attached to the vehicle body 2. The boom 3a is driven by the lift cylinder 3c. The bucket 3b is rotatably attached to the distal end of the boom 3a. The bucket 3b is moved up and down by the bucket cylinder 3d.

The running wheels 4a and 4b have front wheels 4a and rear wheels 4b. The front wheels 4a are attached to the front body 2a. The rear wheels 4b are attached to the rear vehicle body 2b. The cab 5 is mounted on the rear vehicle body 2b. The rear vehicle body 2b has an engine compartment 6. The engine 7 is disposed in the engine compartment 6.

The work vehicle 1 has a front axle device 8a, a rear axle device 8b, and a transmission 9. The front axle device 8a is mounted on the front body 2a. The front axle device 8a is attached to the front wheels 4a. The rear axle device 8b is mounted on the rear body 2b. The rear axle device 8b is attached to the rear wheels 4b. The transmission 9 transmits the drive force from the engine 7 to the front wheels 4a via the front axle device 8a. The transmission 9 transmits the drive force from the engine 7 to the rear wheels 4b via the rear axle device 8b.

Figure 2:
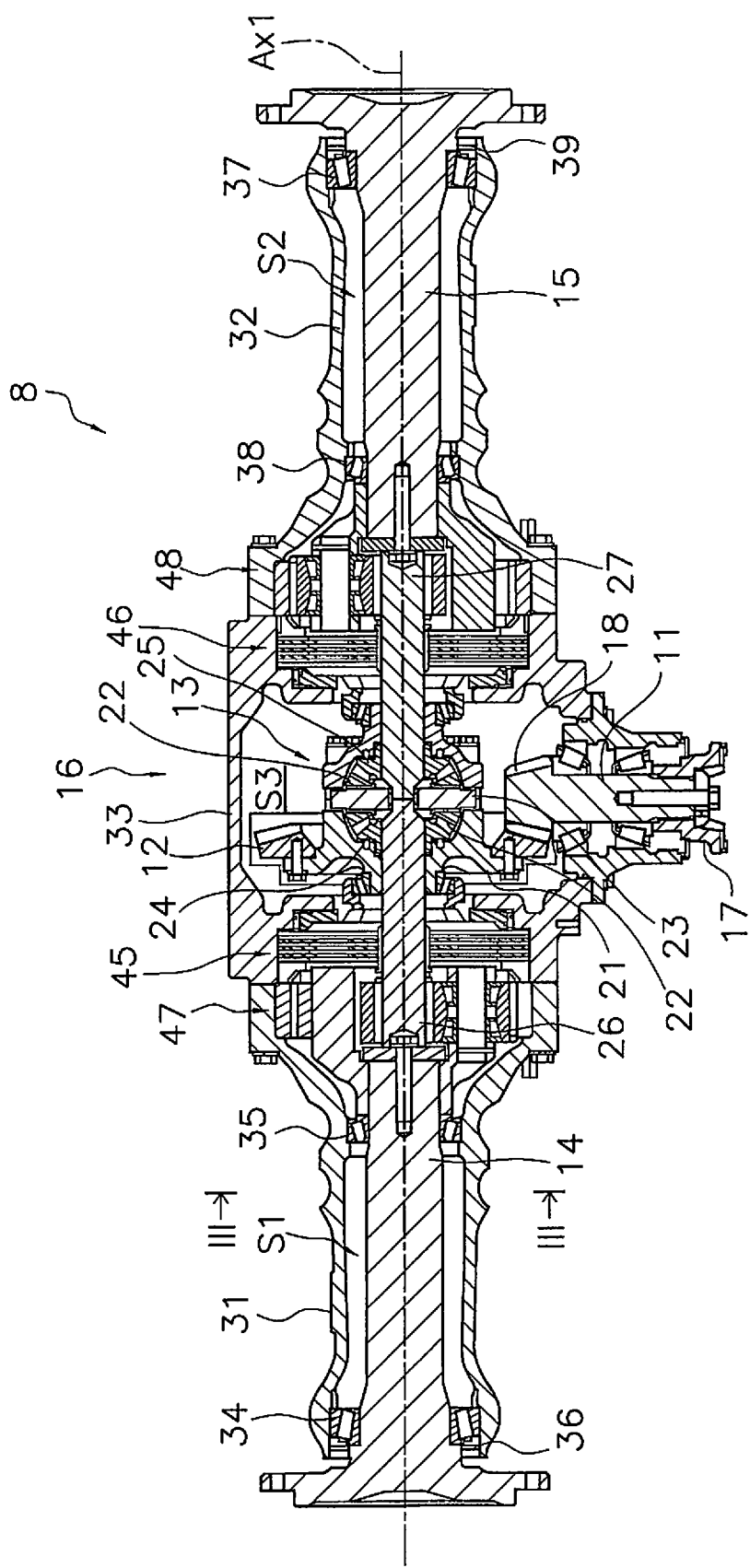
FIG. 2 is a cross sectional plan view of the axle assembly according to the first embodiment.

The axle assembly mounted on the work vehicle 1 as the front axle device 8a and the rear axle device 8b will be described in detail below. FIG. 2 is a cross sectional plan view of the axle assembly 8 according to the first embodiment. As shown in FIG. 2, the axle assembly 8 has a drive shaft 11, a bevel gear 12, a differential 13, a first axle shaft 14, a second axle shaft 15, and an axle housing 16.

The drive shaft 11 extends in a direction perpendicular to the direction of the axis Ax1 of the first axle shaft 14 and the second axle shaft 15 (hereinafter referred to as the "axle axis Ax1"). In a state in which the axle assembly 8 is mounted on the work vehicle 1, the drive shaft 11 extends in the longitudinal direction of the vehicle. One end of the drive shaft 11 is provided with a coupling 17. The other end of the drive shaft 11 is provided with a drive pinion gear 18. The drive shaft 11 is linked to the output shaft of the transmission 9 via the coupling 17.

The bevel gear 12 meshes with the drive pinion gear 18. The bevel gear 12 rotates along with the drive shaft 11. The bevel gear 12 is disposed coaxially with the first axle shaft 14 and the second axle shaft 15.

The differential 13 transmits the rotation of the bevel gear 12 to the first axle shaft 14 and the second axle shaft 15, while permitting a difference in rotational speed between the first axle shaft 14 and the second axle shaft 15. The differential 13 has a differential case 21, a differential pinion gear 22, a differential pinion shaft 23, a first side gear 24, and a second side gear 25. The differential case 21 is linked to the bevel gear 12. The differential case 21 is disposed so as to be rotatable around the axle axis Ax1.

The differential pinion gear 22 is linked to the differential case 21 via the differential pinion shaft 23. When the bevel gear 12 rotates, this causes the differential pinion gear 22 to rotate integrally with the differential case 21 and the differential pinion shaft 23 around the axle axis Ax1. The differential pinion gear 22 is disposed rotatably around the axial direction of the differential pinion shaft 23.

The first side gear 24 and the second side gear 25 mesh with the differential pinion gear 22. The first side gear 24 and the second side gear 25 are disposed coaxially with the first axle shaft 14 and the second axle shaft 15. The first side gear 24 and the second side gear 25 are disposed rotatably around the axle axis Ax1. The first side gear 24 and the second side gear 25 are rotatable around the axle axis Ax1 relative to the differential case 21.

The first axle shaft 14 and the second axle shaft 15 are aligned in the direction of the axle axis Ax1. The first axle shaft 14 is linked to one of the left and right running wheels. The second axle shaft 15 is connected to the other of the left and right running wheels.

The first axle shaft 14 is linked to the first side gear 24 via a first intermediate shaft 26 and a first reduction gear 47 (discussed below). However, the first axle shaft 14 may be linked directly to the first side gear 24. The second axle shaft 15 is linked to the second side gear 25 via a second intermediate shaft 27 and a second reduction gear 48 (discussed below). However, the second axle shaft 15 may be linked directly to the second side gear 25.

The axle housing 16 has a first housing component 31, a second housing component 32, and a central housing component 33. The first housing component 31, the second housing component 32, and the central housing component 33 are aligned in the direction of the axle axis Ax1. The central housing component 33 is located between the first housing component 31 and the second housing component 32 in the direction of the axle axis Ax1.

The first housing component 31 includes a first space S1. Part of the first axle shaft 14 is disposed in the first space S1. The second housing component 32 includes a second space S2. Part of the second axle shaft 15 is disposed in the second space S2. The central housing component 33 includes a central space S3. The central space S3 communicates with the first space S1 and the second space S2. The above-mentioned drive pinion gear 18, bevel gear 12, and differential 13 are disposed in the central space S3.

Figure 3:
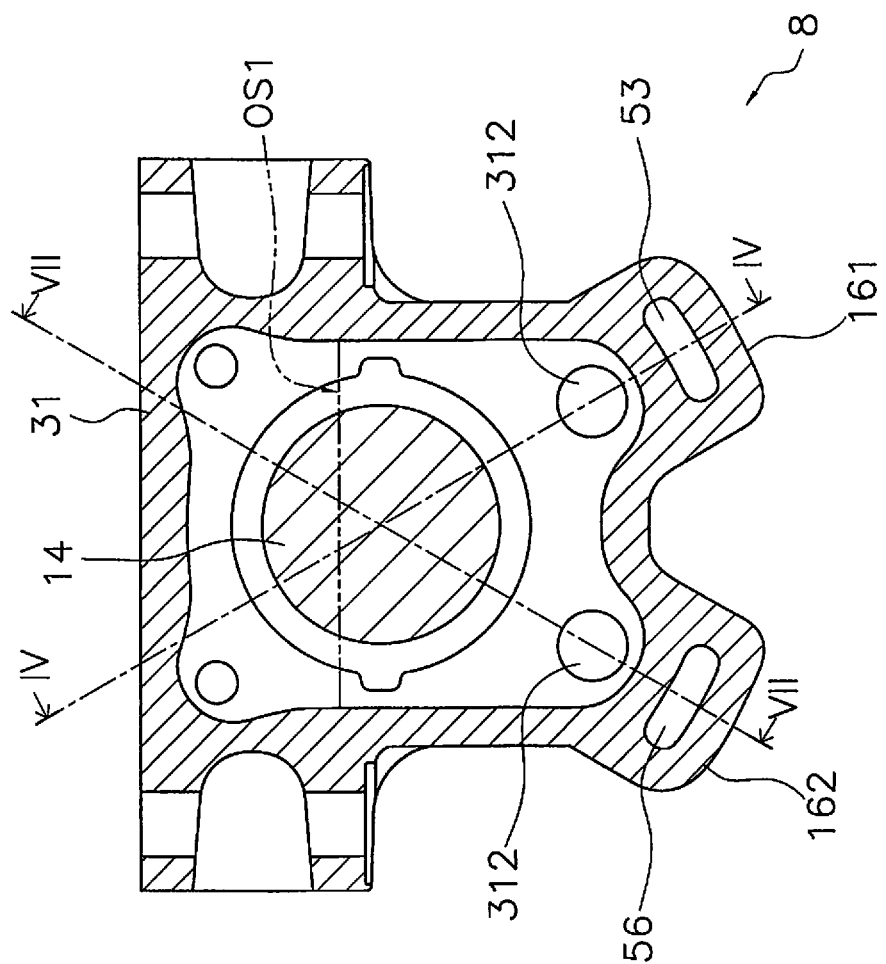
FIG. 3 is a cross section along the line in FIG. 2.
Figure 4:
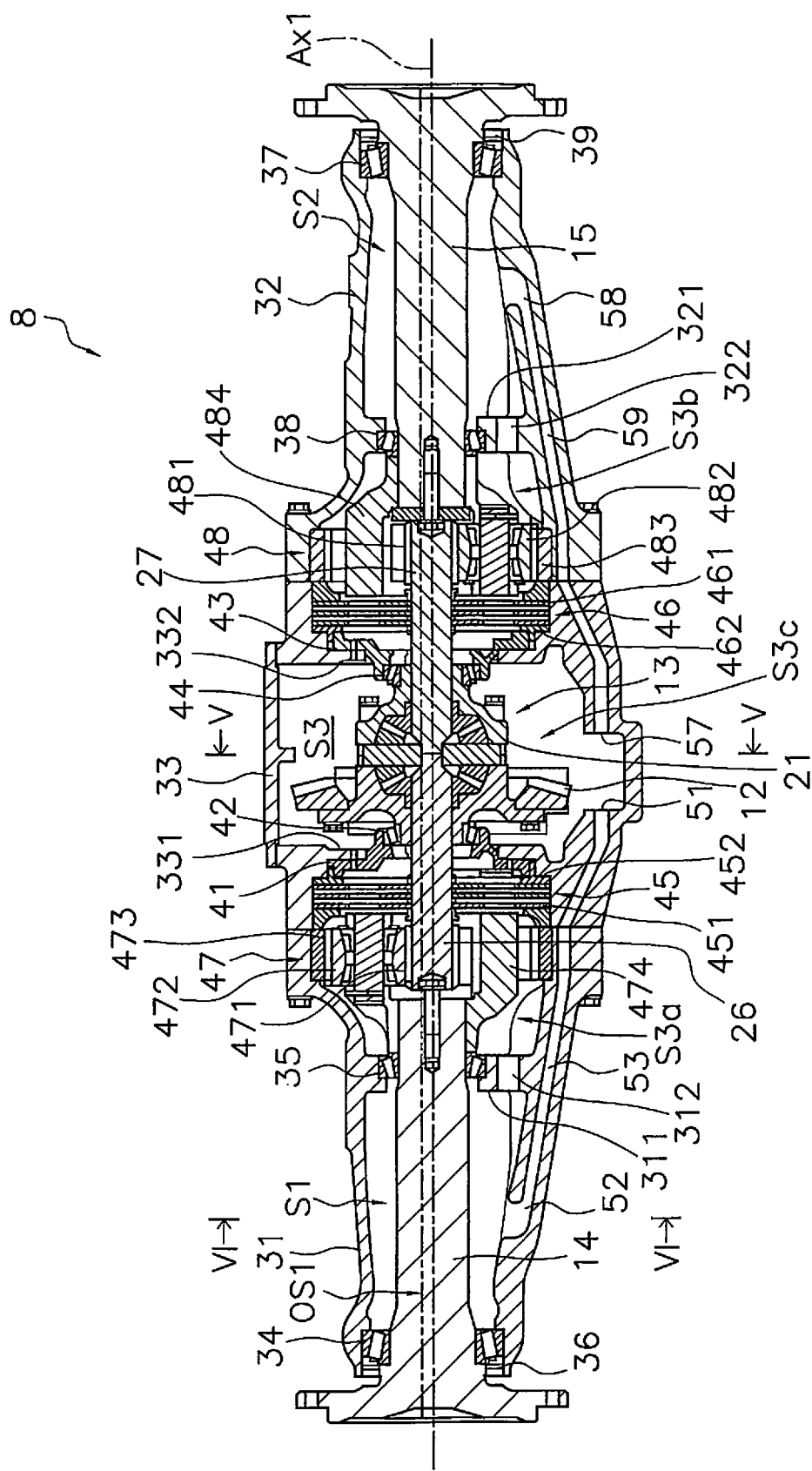
FIG. 4 is a cross section along the IV-IV line in FIG. 3.

FIG. 3 is a cross section along the line in FIG. 2. FIG. 4 is a cross section along the IV-IV line in FIG. 3. As shown in FIG. 4, a first outer bearing 34 and a first inner bearing 35 are disposed in the first housing component 31. The first outer bearing 34 and the first inner bearing 35 rotatably support the first axle shaft 14.

The first space S1 is located between the first outer bearing 34 and the first inner bearing 35. The first inner bearing 35 is located between the first space S1 and the central space S3. A first flange 311 is disposed between the first space S1 and the central space S3. The first flange 311 protrudes from the inner face of the first housing component 31. The first inner bearing 35 is attached to the first flange 311. The first flange 311 is provided with a communicating hole 312 that allows the first space S1 to communicate with the central space S3. A first oil seal 36 is disposed outside the first outer bearing 34, and seals between the first axle shaft 14 and the first housing component 31.

A second outer bearing 37 and a second inner bearing 38 are disposed in the second housing component 32. The second outer bearing 37 and the second inner bearing 38 rotatably support the second axle shaft 15. The second space S2 is located between the second outer bearing 37 and the second inner bearing 38. The second inner bearing 38 is located between the second space S2 and the central space S3. A second flange 321 is disposed between the second space S2 and the central space S3. The second flange 321 protrudes from the inner face of the second housing component 32. The second inner bearing 38 is attached to the second flange 321. The second flange 321 is provided with a communicating hole 322 that allows the second space S2 to communicate with the central space S3. A second oil seal 39 is disposed outside the second outer bearing 37, and seals between the second axle shaft 15 and the second housing component 32.

The central space S3 has a first central space S3a, a second central space S3b, and a third central space S3c. The first central space S3a, the second central space S3b, and the third central space S3c are aligned in the direction of the axle axis Ax1. The third central space S3c is located between the first central space S3a and the second central space S3b in the direction of the axle axis Ax1. The first central space S3a communicates with the first space S1. The second central space S3b communicates with the second space S2.

A first central flange 331 is disposed between the first central space S3a and the third central space S3c. The first central flange 331 protrudes from the inner face of the central housing component 33. A first central bearing 42 is attached to the first central flange 331 via a first support member 41. The first central bearing 42 rotatably supports the above-mentioned differential case 21.

A second central flange 332 is disposed between the second central space S3b and the third central space S3c. The second central flange 332 protrudes from the inner face of the central housing component 33. A second central bearing 44 is attached to the second central flange 332 via a second support member 43. The second central bearing 44 rotatably supports the above-mentioned differential case 21.

The axle assembly 8 has a first brake device 45 and a second brake device 46. The first brake device 45 is disposed in the first central space S3a. The second brake device 46 is disposed in the second central space S3b. The first brake device 45 has a plurality of first brake disks 451 and a first piston 452. The first brake disks 451 are disposed coaxially with the first axle shaft 14. When the first piston 452 presses the first brake disks 451, the rotation of the first axle shaft 14 is braked.

The second brake device 46 has a plurality of second brake disks 461 and a second piston 462. The second brake disks 461 are disposed coaxially with the second axle shaft 15. When the second piston 462 presses the second brake disks 461, the rotation of the second axle shaft 15 is braked.

The axle assembly 8 has the first reduction gear 47 and the second reduction gear 48. The first reduction gear 47 is disposed in the first central space S3a. The first reduction gear 47 is aligned with the first brake device 45 in the direction of the axle axis Ax1. The first brake device 45 is disposed between the first reduction gear 47 and the differential 13 in the direction of the axle axis Ax1. The first reduction gear 47 transmits the rotation of the first intermediate shaft 26 to the first axle shaft 14.

The first reduction gear 47 has a planetary gear mechanism. More precisely, the first reduction gear 47 has a first sun gear 471, a plurality of first planetary gears 472, a first ring gear 473, and a first carrier 474. The first sun gear 471 is linked to the first intermediate shaft 26. The first planetary gears 472 mesh with the first sun gear 471. The first planetary gears 472 revolve around the first sun gear 471 while rotating around the axis of the first planetary gears 472. The first ring gear 473 meshes with the first planetary gears 472. The first carrier 474 is linked to the first planetary gears 472. The first carrier 474 rotates around the axle axis Ax1 as the first planetary gears 472 revolve. The first carrier 474 is linked to the first axle shaft 14.

The second reduction gear 48 is disposed in the second central space Sib. The second reduction gear 48 is aligned with the second brake device 46 in the direction of the axle axis Ax1. The second brake device 46 is disposed between the second reduction gear 48 and the differential 13 in the direction of the axle axis Ax1. The second reduction gear 48 transmits the rotation of the second intermediate shaft 27 to the second axle shaft 15.

The second reduction gear 48 has a planetary gear mechanism. More precisely, the second reduction gear 48 has a second sun gear 481, a plurality of second planetary gears 482, a second ring gear 483, and a second carrier 484. Since the configuration of these gears is the same as that of the gears in the first reduction gear 47, it will not be described again in detail here.

The axle assembly 8 is filled with lubricating oil for lubricating the various devices discussed above. A structure for circulating the lubricating oil in the axle assembly 8 will now be described.

As shown in FIGS. 3 and 4, the axle assembly 8 has a first inlet port 51, a first outlet port 52, and a first oil passage 53.

Figure 5:
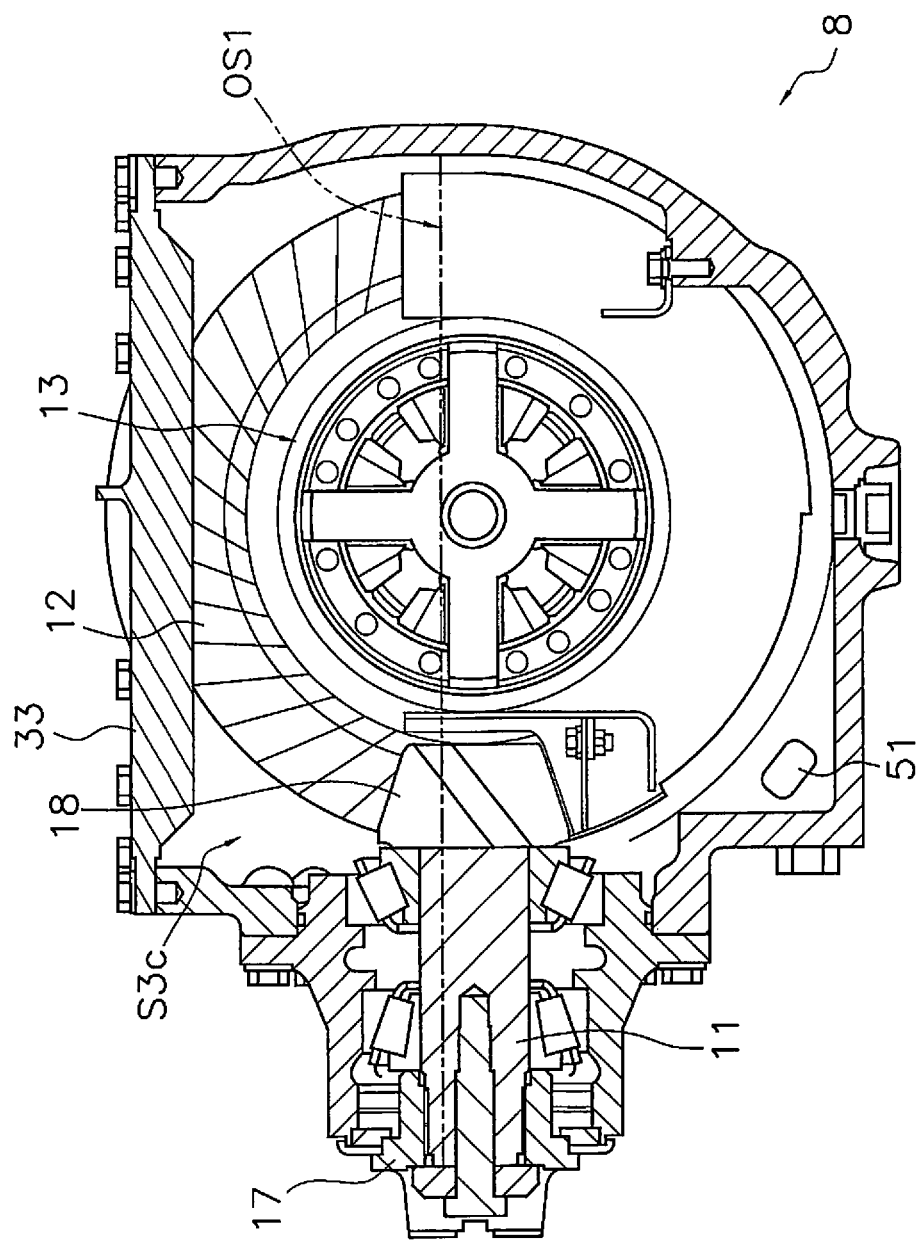
FIG. 5 is a cross section along the V-V line in FIG. 4.

FIG. 5 is a cross section along the V-V line in FIG. 4. As shown in FIGS. 4 and 5, the first inlet port 51 is disposed contiguous with the bevel gear 12. The first inlet port 51 is disposed so as to face the space located radially outward from the bevel gear 12. The first inlet port 51 is disposed in the third central space S3c. The first inlet port 51 opens into the third central space S3c in the direction of the axle axis Ax1. The first inlet port 51 is disposed below the oil level OS1 in the third central space S3c. The first inlet port 51 is disposed below the axle axis Ax1. The first inlet port 51 is disposed more toward the center than the reduction gear in the left and right direction.

Figure 6:
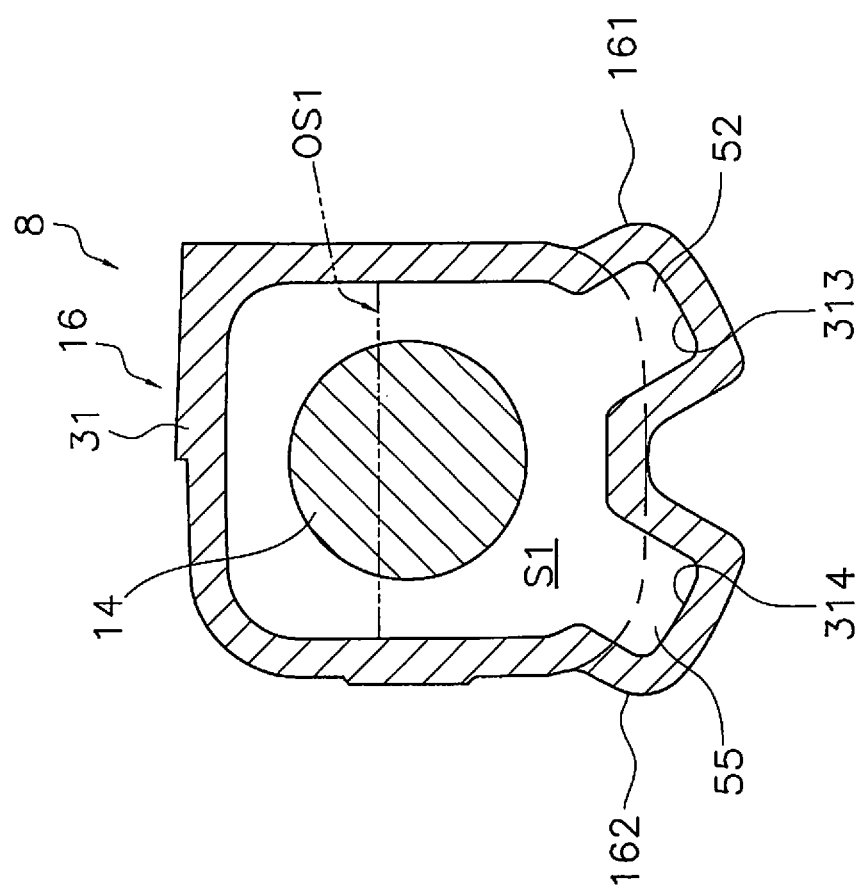
FIG. 6 is a cross section along the VI-VI in line FIG. 4. FIG.

FIG. 6 is a cross section along the VI-VI line in FIG. 4. As shown in FIGS. 4 and 6, the first outlet port 52 is disposed in the first space S1. As shown in FIG. 6, the inner face of the axle housing 16 has a first concave portion 313 that is recessed downward. The first outlet port 52 is disposed in the first recess 313. The first outlet port 52 is disposed below the oil surface OS1 in the first space S1. The first outlet port 52 is disposed below the axle axis Ax1.

As shown in FIG. 4, the first oil passage 53 extends from the first inlet port 51 to the first outlet port 52. Therefore, the third central space S3c communicates with the first space S1 via the first oil passage 53. The first oil passage 53 is disposed inside the axle housing 16. That is, the first oil passage 53 is disposed between the inner faces of the central housing component 33 and the first housing component 31, and the outer faces of the central housing component 33 and the first housing component 31. As shown in FIG. 3, the axle housing 16 has a first convex portion 161 that protrudes downward. The first oil passage 53 is disposed in the first convex portion 161.

Figure 7:
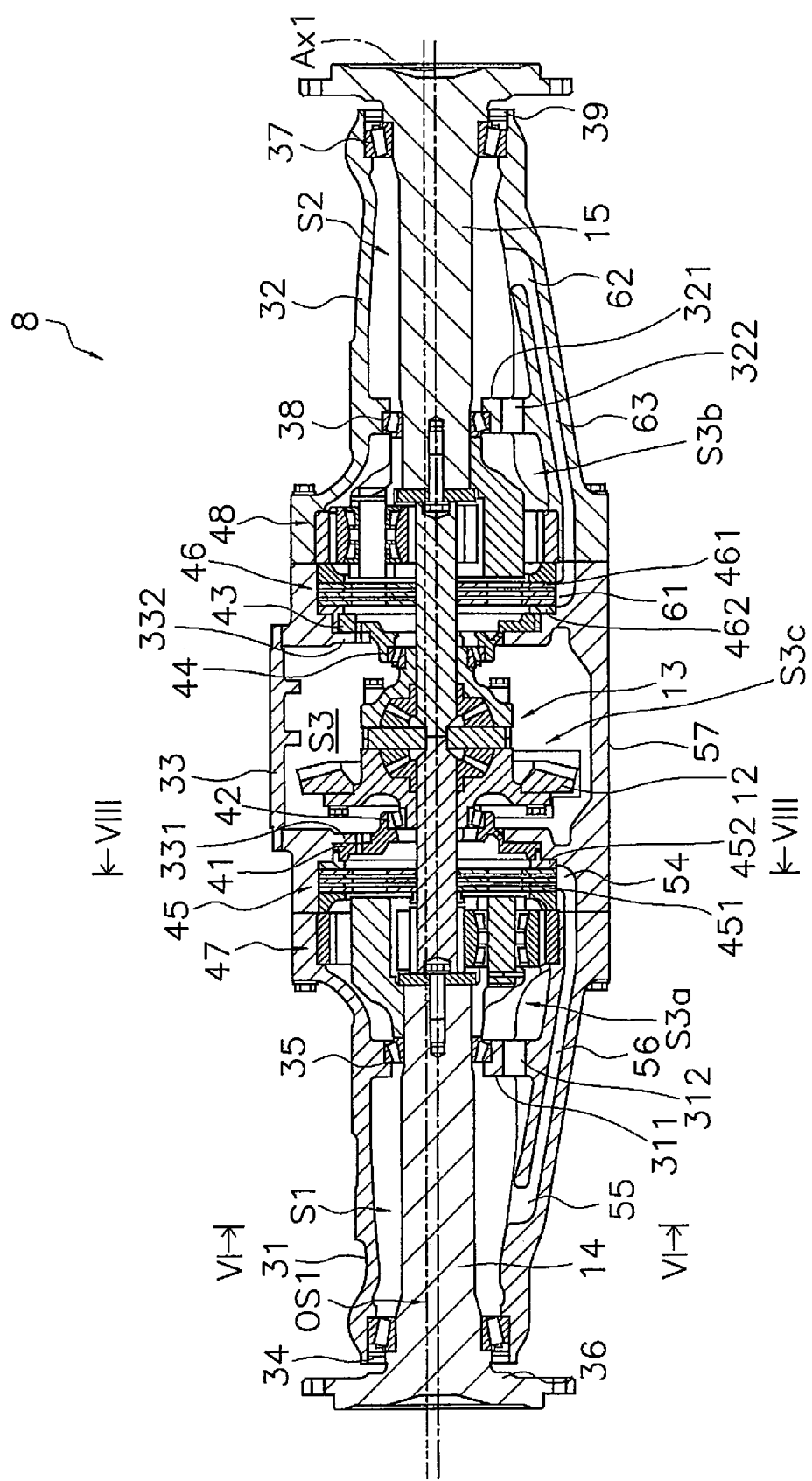
FIG. 7 is a cross section along the line VII-VII line in FIG. 3.
Figure 8:
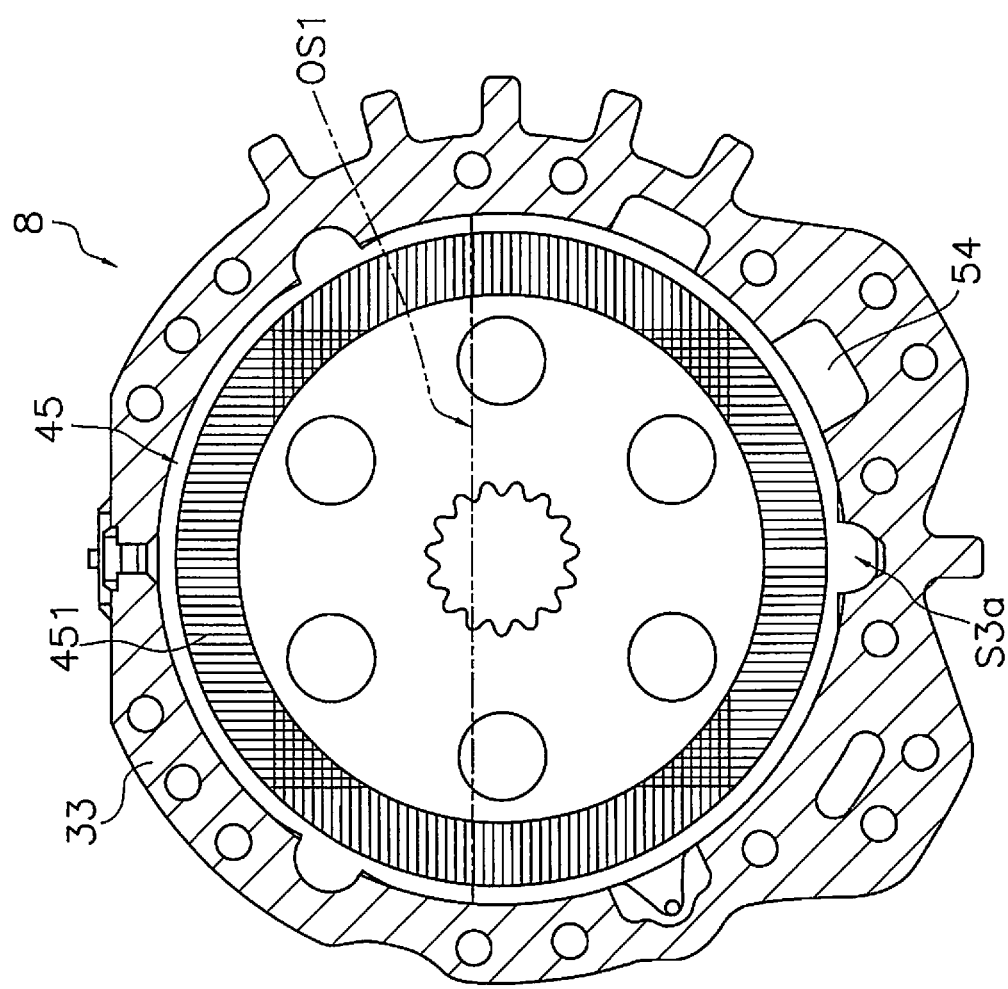
FIG. 8 is a cross section along the VIII-VIII line in FIG. 7.

FIG. 7 is a cross section along the VII-VII line in FIG. 3. As shown in FIGS. 3 and 7, the axle assembly 8 has a second inlet port 54, a second outlet port 55, and a second oil passage 56. FIG. 8 is a cross section along the VIII-VIII line in FIG. 7. As shown in FIGS. 7 and 8, the second inlet port 54 is disposed contiguous with the first brake disks 451. The second inlet port 54 is disposed so as to face a space located radially outward from the first brake disks 451. The second inlet port 54 is disposed in the first central space S3a. The second inlet port 54 faces radially inward from the first brake disks 451 and opens into the first central space S3a. The second inlet port 54 is disposed to face the first brake disks 451 in the radial direction of the first brake disks 451. The second inlet port 54 is disposed below the oil surface OS1 in the first central space S3a. The second inlet port 54 is disposed below the axle axis Ax1. The second inlet port 54 is disposed more toward the center than the reduction gear in the left and right direction.

As shown in FIG. 7, the second outlet port 55 is disposed in the first space S1. As shown in FIG. 6, the inner face of the axle housing 16 has a second concave portion 314 that is recessed downward. The second outlet port 55 is disposed in the second recess 314. The second outlet port 55 is disposed below the oil level OS1 in the first space S1. The second outlet port 55 is disposed below the axle axis Ax1.

As shown in FIG. 7, the second oil passage 56 extends from the second inlet port 54 to the second outlet port 55. Therefore, the first central space S3a communicates with the first space S1 via the second oil passage 56. The second oil passage 56 is disposed inside the axle housing 16. That is, the second oil passage 56 is disposed between the inner faces of the central housing component 33 and the first housing component 31, and the outer faces of the central housing component 33 and the first housing component 31. As shown in FIG. 3, the axle housing 16 has a second convex portion 162 that protrudes downward. The second oil passage 56 is disposed in the second convex portion 162.

As shown in FIG. 4, the axle assembly 8 has a third inlet port 57, a third outlet port 58, and a third oil passage 59. Like the first inlet port 51, the third inlet port 57 is disposed in the third central space S3c and is disposed contiguous with the bevel gear 12. The third inlet port 57 is disposed below the oil surface OS1 in the third central space S3c. The third inlet port 57 is disposed below the axle axis Ax1. The third inlet port 57 is disposed more toward the center than the reduction gear in the left and right direction. The third outlet port 58 is disposed in the second space S2. The third outlet port 58 is disposed below the oil level OS1 in the second space S2. The third outlet port 58 is disposed below the axle axis Ax1.

The third oil passage 59 extends from the third inlet port 57 to the third outlet port 58. Therefore, the third central space S3c communicates with the second space S2 via the third oil passage 59. The third oil passage 59 is disposed inside the axle housing 16. That is, the third oil passage 59 is disposed between the inner faces of the central housing component 33 and the second housing component 32, and the outer faces of the central housing component 33 and the second housing component 32.

As shown in FIG. 7, the axle assembly 8 has a fourth inlet port 61, a fourth outlet port 62, and a fourth oil passage 63. The fourth inlet port 61 is disposed contiguous with the second brake disks 461. The fourth inlet port 61 is disposed so as to face a space located radially outward from the second brake disks 461. The fourth inlet port 61 is disposed in the second central space S3b. The fourth inlet port 61 faces radially inward from the second brake disks 461 and opens into the second central space S3b. The fourth inlet port 61 is disposed facing the second brake disks 461 in the radial direction of the second brake disks 461. The fourth inlet port 61 is disposed below the oil level OS1 in the second central space S3b. The fourth inlet port 61 is disposed below the axle axis Ax1. The fourth inlet port 61 is disposed more toward the center than the reduction gear in the left and right direction. The fourth outlet port 62 is disposed in the second space S2. The fourth outlet port 62 is disposed below the oil level OS1 in the fourth space. The fourth outlet port 62 is disposed below the axle axis Ax1.

As shown in FIG. 7, the fourth oil passage 63 extends from the fourth inlet port 61 to the fourth outlet port 62. Therefore, the second central space S3b communicates with the second space S2 via the fourth oil passage 63. The fourth oil passage 63 is disposed inside the axle housing 16. That is, the fourth oil passage 63 is disposed between the inner faces of the central housing component 33 and the second housing component 32, and the outer faces of the central housing component 33 and the second housing component 32.

The second housing component 32 has a structure substantially symmetrical with the first housing component 31. Therefore, just like the first convex portion 161, the third oil passage 59 is disposed in a convex portion that protrudes downward and is provided to the second housing component 32. Just like the second convex portion 162, the fourth oil passage 63 is disposed in a convex portion that is protrudes downward and is provided to the second housing component 32.

With the axle assembly 8 according to this embodiment described above, the lubricating oil in the central space S3 flows through the first inlet port 51, the first oil passage 53, and the first outlet port 52 to the first space S1. Also, the lubricating oil in the central space S3 flows through the second inlet port 54, the second oil passage 56, and the second outlet port 55 to the first space S1. Since the first space S1 communicates with the central space S3, the lubricating oil returns from the first space S1 to the central space S3. Circulating the lubricating oil in this manner improves the effect of cooling the lubricating oil.

In particular, the first inlet port 51 is disposed contiguous with the bevel gear 12, and the second inlet port 54 is disposed contiguous with the first brake disks 451. Therefore, the heat generated in the rotating bodies such as the bevel gear 12 and the first brake disks 451 can be effectively cooled.

Also, since the first inlet port 51 and the second inlet port 54 are disposed below the axle shaft Ax1 in the central space S3, the lubricating oil flows from the first inlet port 51 and the second inlet port 54 to the oil passage. Therefore, compared to when the lubricating oil is splashed up and its potential energy is utilized, energy loss can be reduced while minimizing the increase in size of the axle assembly 8.

Since the first and second inlet ports 51 and 54, the first and second outlet ports 52 and 55, and the first and second oil passages 53 and 56 are disposed below the axle axis Ax1, they are disposed in a relatively low position in the axle assembly 8. For example, the first and second inlet ports 51 and 54, the first and second outlet ports 52 and 55, and the first and second oil passages 53 and 56 are disposed below the bottoms of the first axle shaft 14 and the second axle shaft 15.

In a state in which the axle assembly 8 is installed in the work vehicle 1, the constituent parts of the work vehicle 1 are disposed above the axle assembly 8. Therefore, when the inlet port, the oil passage, and the outlet port are provided in the upper part of the axle assembly 8 as described above, their layout is restricted in order to avoid interference with the constituent parts of the work vehicle 1. However, with the axle assembly 8 in this embodiment, the inlet ports 51 and 54, the oil passages 53 and 56, and the outlet ports 52 and 55 are disposed at low positions in the axle assembly 8. Therefore, there is greater latitude in the layout of the inlet ports 51 and 54, the oil passages 53 and 56, and the outlet ports 52 and 55.

The first and second inlet ports 51 and 54, the first and second outlet ports 52 and 55, and the first and second oil passages 53 and 56 are disposed inside the axle housing 16. This further minimizes an increase in the size of the axle housing 16.

The same effect as with the first inlet port 51, the first outlet port 52, and the first oil passage 53 can be obtained with the third inlet port 57, the third outlet port 58, and the third oil passage 59. Also, the same effect as with the second inlet port 54, the second outlet port 55, and the second oil passage 56 can be obtained with the fourth inlet port 61, the fourth outlet port 62, and the fourth oil passage 63.

An embodiment of the present invention was described above, but the present invention is not limited to or by the above embodiment, and various modifications are possible without departing from the gist of the invention.

The layout of the first to fourth inlet ports 51, 54, 57, and 61 may be changed. For example, the first and third inlet ports 51 and 57 may be disposed at positions that are not contiguous with the bevel gear 12.

The second inlet port 54 may be disposed at a position that is not contiguous with the first brake disks 451. For example, the second inlet port 54 may be disposed at a position that is contiguous with the first reduction gear 47. The fourth inlet port 61 may be disposed at a position that is not contiguous with the second brake disks 461. For example, the fourth inlet port 61 may be disposed at a position that is contiguous with the second reduction gear 48.

As long as the first to fourth inlet ports 51, 54, 57, and 61 are disposed below the axle axis Ax1, they may be disposed above their position in the above embodiment. For example, the first to fourth inlet ports 51, 54, 57, and 61 may be disposed above the bottoms of the first axle shaft 14 and the second axle shaft 15.

The position of the oil surface OS1 may be changed. For example, in the above embodiment, the oil level OS1 is disposed above the axle axis Ax1, but the oil level OS1 may be disposed below the axle axis Ax1.

The layout of the first to fourth outlet ports 52, 55, 58, and 62 may be changed. For example, the first to fourth outlet ports 52, 55, 58, and 62 may be disposed above the axle axis Ax1.

Some of the first to fourth inlet ports 51, 54, 57, and 61, the first through fourth outlet ports 52, 55, 58, and 62, and the first through fourth oil passages 53, 56, 59, and 63 may be omitted. For example, the second and fourth inlet ports 54 and 61, the second and fourth outlet ports 55 and 62, and the second and fourth oil passages 56 and 63 may be omitted.

Alternatively, the first inlet port 51, the first outlet port 52, and the first oil passage 53 in the above embodiment may be omitted, and the second inlet port 54, the second outlet port 55, and the second oil passage 56 may be provided as a first inlet port, a first outlet port, and a first oil passage. That is, instead of circulating the lubricating oil around the bevel gear 12 to the first space S1 and the second space S2, the lubricating oil around first brake disks 451 may be circulated to the first space S1 and the second space S2.

Figure 9:
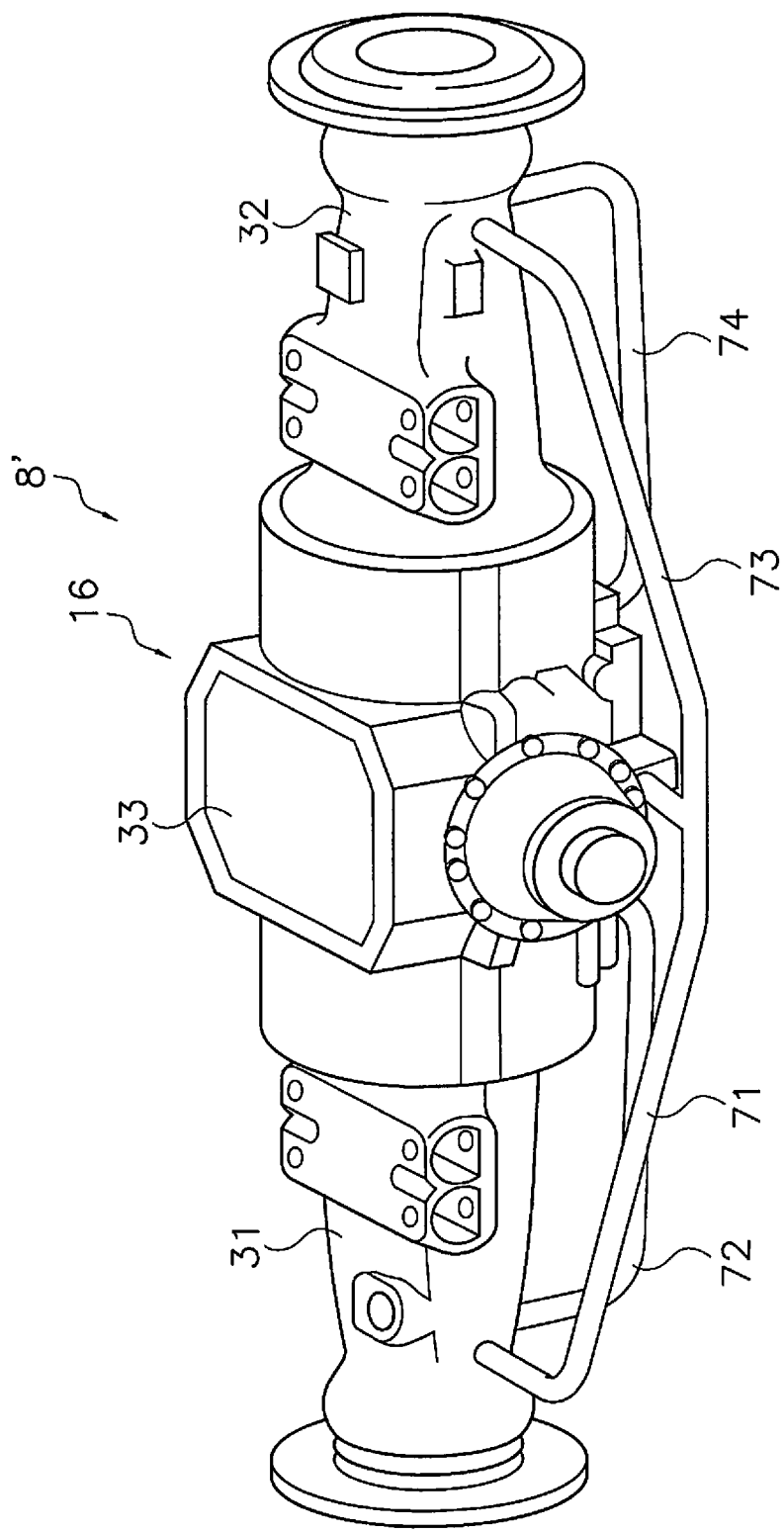
FIG. 9 is a view of the axle assembly according to a second embodiment.

The layout of the first to fourth oil passages 53, 56, 59, and 63 may be changed. For example, some or all of the first to fourth oil passages 53, 56, 59, and 63 may be disposed outside the axle housing 16. FIG. 9 shows an axle assembly 8' according to a second embodiment. As shown in FIG. 9, the axle assembly 8' in the second embodiment may comprise a first pipe 71, a second pipe 72, a third pipe 73, and a fourth pipe 74.

In this case, the first pipe 71 is connected to the first inlet port 51 and the first outlet port 52, and the first oil passage 53 is disposed in the first pipe 71. The second pipe 72 is connected to the second inlet port 54 and the second outlet port 55, and the second oil passage 56 is disposed in the second pipe 72. The third pipe 73 is connected to the first inlet port 51 and the third outlet port 58, and the third oil passage 59 is disposed in the third pipe 73.

That is, the third oil passage 59 is connected to the common first inlet port 51 of the first oil passage 53, and branches off from the first oil passage 53. However, the third pipe 73 may be connected to the third inlet port 57 and the third outlet port 58. The fourth pipe 74 is connected to the fourth inlet port 61 and the fourth outlet port 62, and the fourth oil passage 63 is disposed in the fourth pipe 74.

With the axle assembly 8' according to the second embodiment, the first to fourth oil passages 53, 56, 59, and 63 in the first to fourth pipes 71 to 74 are disposed outside the axle housing 16. Therefore, the effect of cooling the lubricating oil can be further improved.

With the present invention, it is possible to reduce energy loss in an axle assembly, and the effect of cooling the lubricating oil can be improved while keeping the increase in size to a minimum.

The invention claimed is:

1. An axle assembly, comprising:
   a first axle shaft;
   an axle housing having a first housing component that includes
      a first space in which at least part of the first axle shaft is disposed,
      a flange that is adjacent to the first space and includes a communicating hole, and
      a central housing component that includes a central space connected to the first space through the communicating hole of the flange;
   a first inlet port disposed below an axis of the first axle shaft in the central space;
   a first outlet port disposed in the first space; and
   a first oil passage that extends from the first inlet port to the first outlet port,
   the first axle shaft being supported on a first inner bearing, the first inner bearing being disposed on the flange between the communicating hole and the first axle shaft in a radial direction of the first axle shaft.

2. The axle assembly according to claim 1, wherein the first outlet port is disposed below the axis.

3. The axle assembly according to claim 1, further comprising:
   a rotating body disposed in the central space, the first inlet port being disposed adjacent to the rotating body.

4. The axle assembly according to claim 1, further comprising:
   a rotating body disposed in the central space, the first inlet port being disposed facing a space located radially outward from the rotating body.

5. The axle assembly according to claim 3, wherein the rotating body is a bevel gear.

6. The axle assembly according to claim 3, wherein the rotating body is a brake disk.

7. The axle assembly according to claim 1, wherein the first oil passage is disposed inside the axle housing.

8. The axle assembly according to claim 1, wherein the first oil passage is disposed outside the axle housing.

9. The axle assembly according to claim 1, further comprising:
   a second inlet port disposed below the axis in the central space;
   a second outlet port disposed in the first space;
   a second oil passage that extends from the second inlet port to the second outlet port;
   a first rotating body disposed in the central space; and
   a second rotating body disposed in the central space,
   the first inlet port being disposed adjacent to the first rotating body, and
   the second inlet port being disposed adjacent to the second rotating body.

10. The axle assembly according to claim 9, wherein the first rotating body is a bevel gear, and the second rotating body is a brake disk.

11. The axle assembly according to claim 1, further comprising:
   a second axle shaft aligned in an axial direction with the first axle shaft, the axle housing further including a second housing component that includes a second space in which at least part of the second axle shaft is disposed;
   a third inlet port disposed below the axis in the central space;
   a third outlet port disposed in the second space; and
   a third oil passage that extends from the third inlet port to the third outlet port.

12. The axle assembly according to claim 1, further comprising:
   a second axle shaft aligned in an axial direction with the first axle shaft, the axle housing further including a second housing component that includes a second space in which at least part of the second axle shaft is disposed;
   a third outlet port disposed in the second space; and
   a third oil passage that branches off from the first oil passage and extends to the third outlet port.

13. The axle assembly according to claim 1, further comprising:
   a reduction gear disposed in the axle housing, the first port being disposed more toward a center of the axle housing in an axial direction of the first axle shaft than the reduction gear.

14. The axle assembly according to claim 13, wherein the reduction gear is disposed between the flange and the first inlet port in the axial direction.

15. The axle assembly according to claim 14, wherein the first axle shaft is supported on a first outer bearing, the first outer bearing being disposed at an end of the axle housing farther away from the center than the flange in the axial direction, and
the first outlet port is disposed between the flange and the first outer bearing in the axial direction.

16. The axle assembly according to claim 1, wherein the communicating hole is disposed between the first inner bearing and the first oil passage in the radial direction.

17. The axle assembly according to claim 1, wherein the first inlet port is disposed closer to an axial center of the axle housing than the communicating hole and the first outlet port is disposed father from the axial center of the axle housing than the communicating hole in an axial direction of the first axle shaft.

18. The axle assembly according to claim 17, wherein the communicating hole is disposed between the first axle shaft and the first oil passage in a radial direction if the first axle shaft.

* * * * *